April 12, 1960 P. H. SHERRON 2,932,106
ILLUMINATED TELEPHONE BOOTH
Original Filed March 31, 1954
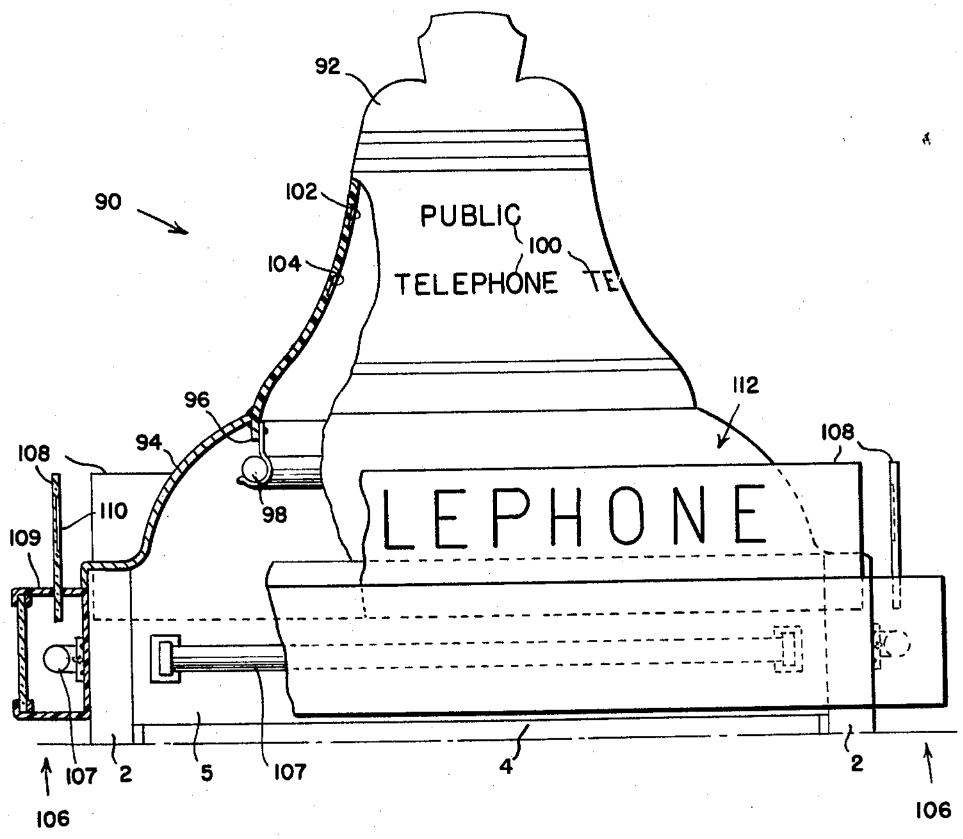
*INVENTOR.*
PERCIVAL H. SHERRON
*BY*
ATTORNEYS 2,932,106

ILLUMINATED TELEPHONE BOOTH

Percival H. Sherron, Jamaica, N.Y.

Original application March 31, 1954, Serial No. 419,963. Divided and this application February 1, 1957, Serial No. 637,676

2 Claims. (Cl. 40—130)

This invention relates to an illuminated public telephone booth and, more particularly, to a public outdoor telephone booth having an illuminated member extending upwardly above the sides of the booth and having illuminated indicia bearing panels extending transversely of the upper portions of the sides of the booth.

This application is a division of my copending application Serial No. 419,963, filed March 13, 1954, now abandoned.

The use of public outdoor telephone booths has increased greatly in recent years coincident with the increase in highway and long distance commuter travel. Public outdoor telephones are installed at intervals along the new super highways, at railway commuter stations, in highway gasoline stations and in numerous other locations where a public outdoor telephone booth may be of service. It is desirable to position the booths where they are completely visible and accessible to the public at all times. Installations of this type avoid the inconvenience formerly attending the use of public telephones which were, for example, usually installed within an attendant's working or showroom space in a gasoline station or in an otherwise occupied enclosure.

It will, of course, be evident that telephone service is as important at night time as it is in the day time. An outdoor telephone booth which is available for twenty-four hours a day is desirably provided with illuminating means in order that the presence of the booth may be observed at night time by a person desiring to make a telephone call.

It is an object of this invention to provide an illuminated telephone booth which will be clearly visible at night from a considerable distance.

It is a further object of the invention to provide a telephone booth having illuminated means extending above the side panels of the booth indicative of the fact that the booth is a telephone booth.

It is a further object of the invention to provide a telephone booth having illuminated panels suitable for bearing the word "Telephone" in an illuminated manner and being of such size that the word is clearly legible from a considerable distance.

It is a further object of the invention to provide means whereby a conventional telephone booth may be provided with external illumination and illuminated indicia indicating the booth to be a telephone booth.

These and other objects of the invention will become apparent from the following description when read in conjunction with the accompanying drawing, in which the figure is an elevation of the top portion of a telephone booth incorporating the present invention.

The basic telephone booth structure involved herein is entirely conventional and includes four corner posts 2 between which there are supported on three sides side panel assemblies 4 and on the fourth side a door assembly not shown in the drawing. A lintel structure 5 is supported between the posts at the upper ends thereof on each side of the booth. The corner posts 2 rest upon a base structure, not shown. Details of this structure are more fully set forth in my copending patent applications Serial No. 307,630, filed September 3, 1952 and Serial No. 340,257, filed March 4, 1953, and now abandoned.

In the drawing there is shown generally at 90 a bell-shaped top member mounted on a telephone booth. The top member includes an upper portion 92 and a lower portion 94. The lower portion 94 is adapted to fit on the top of the booth and to support the upper portion 92 in such a manner that the lowermost edge 96 of the upper portion is exposed within the top member in such a fashion that a circular light tube 98 can be positioned adjacent thereto.

This arrangement provides for the transmission of light through the upper portion 92 which is preferably made of a suitable light conductive plastic material. Suitable indicia markings such as the words "Public Telephone," indicated generally at 100, are recessed in the upper portion 92 of the bell. These recesses are indicated at 102 and 104 in the cut-away portion of the bell. It will be evident that the recesses may alternatively be provided on the exterior surface of the bell and, if desired, may be provided with coloration or edge lining in a contrasting color to provide for visibility of the indicia in the day time without the necessty of illumination. The invention should be construed as applying to any form of indicia carried by the bell which would be illuminated by edge lighting.

One possible arrangement for controlling the illuminating means is set forth in my copending patent application Serial No. 395,447, filed December 1, 1953.

In the drawing there are also shown box structures, indicated at 106, extending transversely of the upper portions of the telephone booth. It will be evident that the structures may take various forms. Extending vertically through the top plate 109 of each of the box structures is a horizontally extending indicia bearing plate which is preferably positioned on a vertical plane. This plate is formed of a suitable light conductive material and is provided with indicia, such as the word "Telephone," as indicated generally at 112 which may be recessed, as indicated at 110, and which is adapted to be illuminated by a light tube 107 mounted within the box structure 106 and positioned to provide edge lighting to the panel 108. Here again the invention should be construed as applying to any form of indicia carried by the panel 108 suitable for illumination by edge lighting.

It will be evident that, if the panel 108 or the top member 92 is formed of a translucent material or is provided with a suitable irregular surface, the entire panel or top member can be made to glow as a result of the edge lighting. In this case the indicia may be in the form of opaque letters painted on the external surface of the panel or the top member or may be in the form of otherwise applied externally positioned indicia forming material of a contrasting color. The language hereinafter employed in the claims relating to the panel and the top member as bearing indicia being illuminated by edge lighting should be construed as including any of these or similar arrangements and the word "dome" should be construed as including a hemispherical top member, a bell-shaped top member, or any similar inverted hollow dome structure.

Various modifications may be made to the invention disclosed herein without departing from the scope of the invention as set forth in the following claims.

What is claimed is:

1. In an outdoor telephone booth, the combination comprising the vertically extending side walls of the booth, a top member covering the top of the booth including a lower section made of opaque material and having an outer marginal area fitted to and supported upon the tops of said side walls, and an indicia bearing upper section made of light conductive material and having a cylindrically shaped lower terminal portion projected downwardly into a central opening formed in said lower section, said upper section being thereby mounted by said lower section in elevated relation to said side walls, and a circular lamp disposed in close underlying relation to said cylindrical terminal portion thereby to edge light said upper section and thereby prominently display the indicia thereon.

2. The combination defined in claim 1 wherein the cylindrical lower terminal portion of the upper top member section projects downwardly through the lower top member section a substantial distance, and the lamp extends about said cylindrical portion in underlying spaced relation thereto, in spaced relation to the inner marginal portion of the lower top member section and in elevated relation to the side walls of the booth.

References Cited in the file of this patent

UNITED STATES PATENTS

| | | |
|---|---|---|
| 2,028,627 | Sherron | Jan. 21, 1936 |
| 2,297,851 | Wyss | Oct. 6, 1942 |
| 2,507,074 | Wiedenhoeft | May 9, 1950 |
| 2,692,808 | Marsh | Oct. 26, 1954 |
| 2,749,429 | Wavell | June 5, 1956 |

FOREIGN PATENTS

| | | |
|---|---|---|
| 649,828 | Great Britain | Feb. 7, 1951 |